United States Patent [19]

Matthews et al.

[11] Patent Number: 5,072,098

[45] Date of Patent: Dec. 10, 1991

[54] ELECTRICALLY HEATED WINDSHIELD CONTROLLER

[75] Inventors: Geoffrey S. Matthews, Livonia; Jan S. Pyko; Martin G. Yagley, both of Sterling Heights, all of Mich.

[73] Assignee: Chrysler Corporation, Highland Park, Mich.

[21] Appl. No.: 536,380

[22] Filed: Jun. 11, 1990

[51] Int. Cl.⁵ .............................................. H05B 1/02
[52] U.S. Cl. .................................. 219/501; 219/519; 219/508; 219/497; 219/203; 322/8
[58] Field of Search ............... 219/202, 203, 519, 497, 219/507–509, 494, 501; 322/8

[56] References Cited

U.S. PATENT DOCUMENTS

| | | | |
|---|---|---|---|
| 3,858,027 | 12/1974 | Phillips | 219/203 |
| 3,898,423 | 8/1975 | Taylor et al. | 219/203 |
| 3,944,893 | 3/1976 | Hayden | 219/203 |
| 3,973,140 | 8/1976 | Phillips | 219/203 |
| 3,982,092 | 9/1976 | Marriott | 219/203 |
| 4,084,126 | 4/1978 | Clements | 219/202 |
| 4,267,433 | 5/1981 | Sahm, III | 219/497 |
| 4,277,672 | 7/1981 | Jones | 219/497 |
| 4,346,337 | 8/1982 | Watrous | 322/25 |
| 4,434,358 | 2/1984 | Apfelbeck et al. | 219/203 |
| 4,506,137 | 3/1985 | Meister | 219/203 |
| 4,520,258 | 5/1985 | Grohmann | 219/202 |
| 4,565,919 | 1/1986 | Bitter et al. | 219/203 |
| 4,673,797 | 6/1987 | Weirick | 219/202 |
| 4,678,982 | 7/1987 | Offiler et al. | 219/202 |
| 4,730,097 | 3/1988 | Campbell et al. | 219/203 |
| 4,808,799 | 2/1989 | Schave | 219/203 |
| 5,013,994 | 5/1991 | Takatsuka | 219/203 |

Primary Examiner—Mark H. Paschall
Attorney, Agent, or Firm—Mark P. Calcaterra

[57] ABSTRACT

Electrical power for an electrically heated vehicle windshield is controlled by an arrangement utilizing a modified alternator coupled to the windshield heater via an autotransformer. In a high power mode, the vehicle battery is coupled to a center tap of the alternator, while in a normal power mode the vehicle battery is coupled to a conventional rectified output of the alternator. A microprocessor controlled silicon controlled rectifier bridge provides direct current to the windshield heater element by rectifying the output of the autotransformer. Additionally, a current sensor coupled to the heater element is utilized by the microprocessor to determine the electrical resistance of the heater element in order to take required diagnostic measures.

15 Claims, 6 Drawing Sheets

ELECTRICALLY HEATED WINDSHIELD CONTROLLER

BACKGROUND OF THE INVENTION

The invention relates generally to circuit arrangements for delivering electrical power to a heating element associated with a vehicular window, such as the windshield. More specifically, the invention concerns an arrangement for delivering one of two available levels of electrical power to a vehicle window heating element.

A number of electrically heated windshield or other vehicle window surface elements have been introduced in the automotive industry for providing for clearing of the window surface by the supply of electrical power thereto. Many such approaches additionally provide for two levels of heater element power—a higher power level for a "de-ice" mode and a lower or normal power level for a "defog" mode. Provisions must be made in all of these arrangements for delivering power from the vehicle's electrical power system.

A typical charging system in a vehicle consists of an alternator and voltage regulator wherein the alternator generates a three-phase alternating current signal which is rectified to direct current by a diode rectifier bridge and applied to the vehicle's battery and electrical loads. The battery voltage is kept within a desired range by the voltage regulator which monitors the battery voltage and adjusts the alternator field current thereby controlling the alternator output and hence the amount of current delivered to the battery and vehicle loads.

Due to the power level required in a typical vehicle window heating operation, special arrangements must be provided between the vehicle power system and the heater element of the window. Such special arrangements typically involve either circuitry utilizing multiple regulators for providing different output levels or relatively heavy alternator and transformer apparatus and complex switching schemes for reconfiguring the automotive power control system depending upon which level of window heating element power is required.

SUMMARY OF THE INVENTION

An arrangement for controlling the supply of electrical power to a heating element associated with the window of a vehicle includes a multi-phase alternator coupled to the vehicle's voltage regulator. The alternator has a center tap, a rectified alternator output and individual phase output taps. A switching element is coupled to the alternator center tap, the rectified alternator output and the vehicle battery, and the switch is operative in a first state to couple the rectified alternator output to the vehicle battery and operative in a second state to couple the alternator center tap to the vehicle battery. A transformer having inputs coupled to the individual phase output taps of the alternator boosts the voltage at its input and provides for impedance matching to the drive circuitry for the heating element of the window. A rectifier bridge coupled between the outputs of the transformer and the heating element is comprised of silicon controlled rectifiers. A microprocessor-based control element is coupled to the switching element and the controlled rectifier bridge at the output of the transformer. The control element is operative to determine the first and second states of the switching element and to enable and disable the controlled rectifier elements in the output rectifier bridge.

The invention additionally contemplates the use of a current sensing element coupled between the microprocessor controller and the heating element associated with the vehicle window. The sensing element is operative to pass data to the control element such that the control element may determine the electrical resistance of the heating element and hence make logical decisions based on the value of the resistance presented by the heating element as to whether or not diagnostic measures are necessary.

BRIEF DESCRIPTION OF THE DRAWING

The objects and features of the invention will become apparent from a reading of a detailed description taken in conjunction with the drawing, in which.

DETAILED DESCRIPTION

Figure 1:
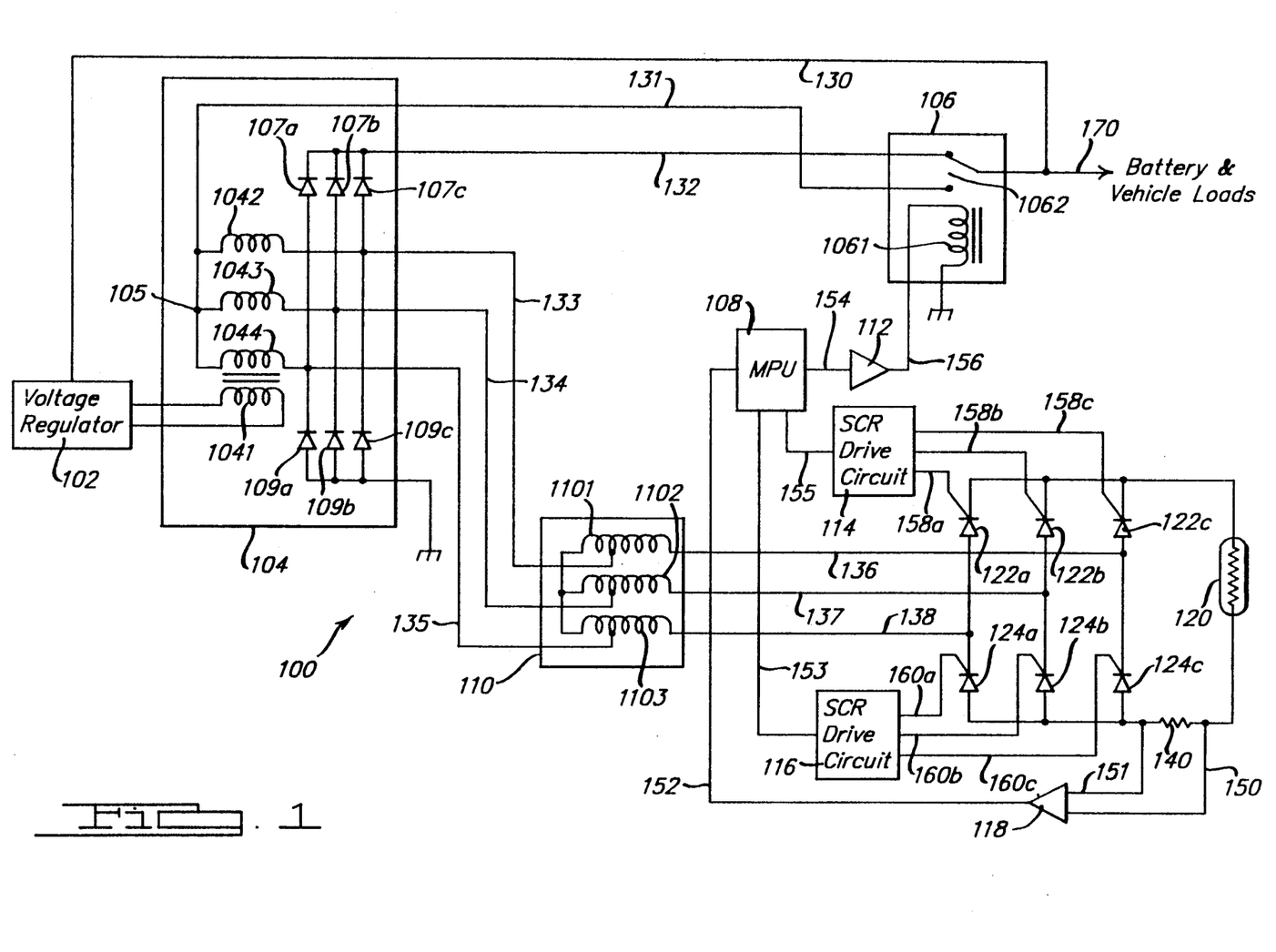
FIG. 1 is a functional circuit schematic of window heater power control apparatus arranged in accordance with the principles of the invention.

The functional schematic of FIG. 1 sets forth an arrangement suitable for delivering power at two different levels to a heating element of a vehicle window such as a windshield.

As will be seen from the discussion below with reference to FIG. 1, three-phase taps and a center tap have been added to an otherwise conventional alternator to provide for the heated window operation. Three-phase AC from the alternator's three-phase taps is supplied to an autotransformer which steps up the voltage to a level required for windshield operation. The autotransformer additionally provides impedance matching for maximum power transfer from the alternator to the windshield heating element.

The three-phase output from the autotransformer is rectified by a silicon controlled rectifier (SCR) bridge. The SCR bridge operates identically to a conventional diode rectifier bridge with the exception that the SCRs may be turned on and off by an external control signal. In this way, average power to the heating element may be continuously varied between 0 and 100% of the maximum power available from the autotransformer by use of a variable duty cycle control signal to the gates of the SCR elements. Additionally, as will be discussed below, use of controlled switch elements in the rectifier bridge may be used in a diagnostic procedure contemplated by the invention.

With reference to FIG. 1, electrically heated windshield controller 100 operates in conjunction with a conventional voltage regulator 102 typically found in automotive electrical power systems. Regulator 102 monitors the vehicle battery via path 130 and regulates charging current to the battery by varying current through field winding 1041 of alternator 104.

Alternator 104 has its three-phase windings 1042, 1043 and 1044 configured in a "Y" configuration with a center tap 105 at the common junction of the three-phase alternator windings coupled via path 131 to a normally open contact of a transfer contact 1062 of electromagnetic relay 106. Alternator 104 additionally includes a conventional full-wave rectifier bridge, one half of the bridge including diodes 107a, 107b and 107c, while the other half of the rectifier bridge is formed by diodes 109a, 109b and 109c.

The cathode electrodes of diodes 107a, 107b and 107c are commonly coupled to an alternator output 132 which in turn is coupled to the vehicle battery and electrical loads at path 170 via a normally closed contact of transfer contact 1062 of relay 106.

The anode electrodes of diodes 109a, 109b and 109c are commonly coupled to ground potential. A first phase output at a terminal of three-phase winding 1042 is coupled to the junction of the anode electrode of diode 107c and the cathode electrode of diode 109c and via path 133 to a center tap of autotransformer winding 1101 of autotransformer 110. A phase output of alternator 104 at a terminal of phase winding 1043 is coupled to a junction of the anode electrode of diode 107b and the cathode electrode of diode 109b and via path 134 to a center tap of autotransformer winding 1102. Similarly, a phase output from alternator winding 1044 is coupled to the junction of the anode electrode of diode 107a and the cathode electrode of diode 109a and via path 135 to a center tap of autotransformer winding 1103.

Autotransformer windings 1101, 1102 and 1103 each have first terminals commonly coupled. Autotransformer output 136 is taken from a second terminal of winding 1101, output 137 of the autotransformer 110 is taken from a second terminal of winding 1102 and autotransformer output 138 is taken from a second terminal of winding 1103.

Outputs 136, 137 and 138 of autotransformer 110 are coupled to a window heating element 120 via a full wave rectifier bridge comprising silicon controlled rectifiers 122a, 122b and 122c in a top portion of the rectifier bridge and silicon controlled rectifiers 124a, 124b and 124c forming a bottom half of the rectifier bridge. Output 136 is coupled to a junction of an anode electrode of SCR 122c and a cathode electrode of SCR 124c. Output 137 is coupled to a junction of an anode electrode of SCR 122b and a cathode electrode of SCR 124b. Similarly, output 138 is coupled to a junction of a an anode electrode of SCR 122a and a cathode electrode of SCR 124a.

The anode electrodes of SCRs 122a, 122b and 122c are commonly coupled to a first terminal of window heating element 120, while the cathode electrodes of SCRs 124a, 124b and 124c are commonly coupled via resistor 140 to a second terminal of window heating element 120.

The SCRs forming the rectifier bridge are controlled by a microprocessor unit 108. Microprocessor 108 could comprise, for example, a type 6805 commercially available from Motorola.

Output 155 of processor 108 is coupled to SCR drive circuit 114, which, in turn, has drive outputs 158a, 158b and 158c respectively coupled to gate electrodes of SCRs 122a, 122b and 122c.

Output 153 of processor 108 is coupled to SCR drive circuit 116, which, in turn, has drive outputs 160a, 160b and 160c respectively coupled to gate electrodes of SCRs 124a, 124b and 124c.

SCR drive circuits 114 and 116 may both comprise, for example, device numbers MOC 3031 commercially available from Motorola.

Processor output 154 is coupled via relay driver amplifier 112 and path 156 to a first terminal of coil 1061 of relay 106. A second terminal of coil 1061 is coupled to ground potential.

Processor input 152 is coupled to an output of a current sense amplifier 118 which, in turn, has its inputs 150 and 151 coupled to opposite terminals of current sensing resistor 140. Sense amplifier 118 could comprise, for example, a type LM 2901 operational amplifier commercially available from Motorola.

Alternator 104 provides electrical power for vehicle electrical loads, battery charging and the electrically heated window element 120. Regulator 102 monitors battery voltage and supplies current to alternator field winding 1041. Relay 106, with coil 1061 deenergized, couples the battery to alternator 104 at its rectifier bridge output 132. With coil 1061 energized (via signals received from processor 108), relay 106 operates its transfer contact 1062 to couple the battery via path 170 and path 131 to center tap 105 of alternator 104.

Three-phase alternating current is supplied to autotransformer 110 from the three-phase taps at paths 133 134 and 135. The autotransformer output is rectified to direct current by the SCR bridge and applied to the heater element 120. Microprocessor unit 108 controls the SCR bridge through SCR drive circuits 114 and 116. Current through heater element 120 is sensed by current sense amplifier 118 and resistor 140. The output of the current sense amplifier 118 is utilized by processor 108 to calculate the resistance presented by element 120. Additionally, processor 108 may continuously vary the duty cycle of the SCR bridge elements in conjunction with the sensed current to regulate power to element 120.

With relay 106 energized, power to the vehicle loads and battery via path 170 is supplied from center tap 105 of alternator 104. With balanced windings 1042, 1043 and 1044 coupled in a "Y" configuration, the output of center tap 105 is virtually DC and requires no rectification. However, the output of center tap 105, at low alternator RPM, is substantially less than that from the normal rectified output 132. Hence, with relay 106 energized, a minimum alternator RPM needs to be maintained for acceptable charging system performance. One approach to achieving the minimum RPM, as described in more detail below with reference to FIGS. 2A-2D, is for the processor unit to monitor (via paths not specifically shown) the gear shift setting of the vehicle such that the relay 106 is operated only when the vehicle is in park or neutral, and the engine RPM is set at a faster "cold" idle setting.

With the arrangement as shown in FIG. 1, the invention affords the provision of a dual level alternator power output with a relatively simple switch arrangement. Due to the effect of impedance matching, the power output of alternator 104 depends upon the operating voltage of the alternator. This is especially significant at higher alternator RPM. Normally, with relay 106 deenergized, the alternator output voltage (phase-to-phase) is limited to the battery voltage of the vehicle. However, with relay 106 energized, the voltage at the center tap 105 is limited to the vehicle battery voltage and the phase-to-phase voltage will be approximately 1.7 times the battery voltage. This results in an increase in power available from alternator 104 and allows a smaller alternator to be utilized than would be normally required in a conventional system.

The arrangement of FIG. 1 additionally offers a advantage of a reduction in the requirements for the turns ratio of autotransformer 110. The power applied to heating element 120 varies with the square of the applied voltage. The maximum voltage available for delivery to element 120 depends on the output voltage of alternator 104 and the secondary-to-primary turns ratio of autotransformer 110. With relay 106 energized, the center tap voltage at 105 of alternator 104 will equal the vehicle's battery voltage and the phase-to-phase voltage (applied to autotransformer 110 via phase outputs 133, 134 and 135) will be approximately 1.7 times the vehicle's battery voltage level. Hence, the turns ratio of autotransformer 110 may be reduced by a factor of 1/1.7 with attendant reduction in size, weight and cost of autotransformer 110.

The arrangement of FIG. 1 additionally provides an added advantage of reduced complexity to the transformer 110 itself. In systems with two operating modes—i.e. a high power "de-ice" mode (used when the vehicle is stationary with the gear in park or neutral) and a low power "defog" mode, it is customary to have two sets of taps on the autotransformer allowing either of two turns ratios to be selected. The ability to switch between an alternator center tap output and the alternator rectified output makes available two power levels by varying the autotransformer input voltage instead of varying the turns ratio. This, in turn, leads to a substantial simplification in the autotransformer layout when compared to arrangements of the prior art.

The microprocessor 108 of FIG. 1 may utilize any of a number of methods for administering power to the heater element 120. One example of such a method is the routine described in the flow chart set forth in FIGS. 2A-2D. Those skilled in the art will readily recognize that such a microprocessor unit 108 could be coupled to other portions of the vehicle system to monitor preselected vehicle system operating parameters in order to make the decisions called for in the window heating control system method set forth in the flow charts of FIGS. 2A-2D.

Figure 2A:
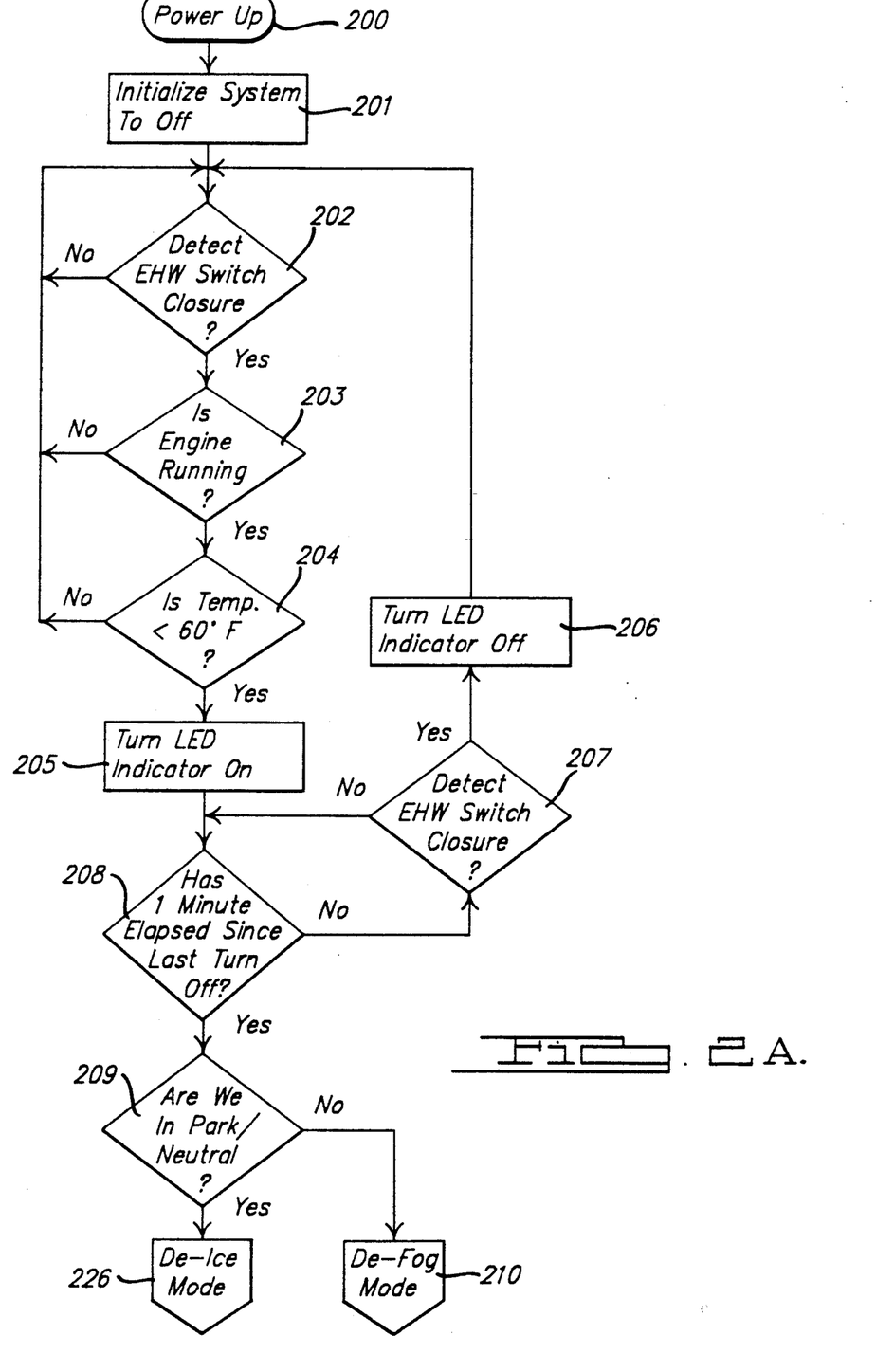
FIGS. 2A, 2B, 2C and 2D present a flow chart of a method of operation of a window de-icer/defogger which may utilize the apparatus of FIG. 1 in accordance with the principles of the invention.

In reference to FIG. 2A, a program resident in microprocessor unit 108 would begin at step 200 upon powerup. Upon powerup the system would be initialized to the off state at block 201. Following the initialization step, a series of decisions at blocks 202, 203 and 204 would be performed. Under these tests, a light emitting diode (LED) indicating activation of the window heating element system would be turned on only if (a) a switch closure indicating a manual selection by the vehicle operator has been actuated; (b) the vehicle's engine is running; and (c) the temperature of the window being heated is less than 60° F. If these conditions are satisfied, then at block 205 the LED indicator is turned on and a time delay of at least one minute since the previous turn-off of the system is effectuated at block 208. During this time delay the microprocessor would monitor for the re-closure of the manual switch at block 207. If the switch is reactivated during this time, that would be an indication that the operator would wish the heating system to be turned off, which would be effectuated via block 206. Under this condition the routine would return to block 202 to monitor for a reactivation of the switch.

Assuming such switch reactivation had not occurred during the one minute delay being monitored at block 208, the next decision block at 209 would have the microprocessor 108 of FIG. 1 determine whether the vehicle is in park or neutral gear. If the vehicle is in park or neutral, the routine transfers to the DE-ICE mode of operation 226 or FIG. 2C. If the vehicle is not in the park or neutral gear, then the DEFOG mode 210 of FIG. 2B is entered.

Figure 2B:
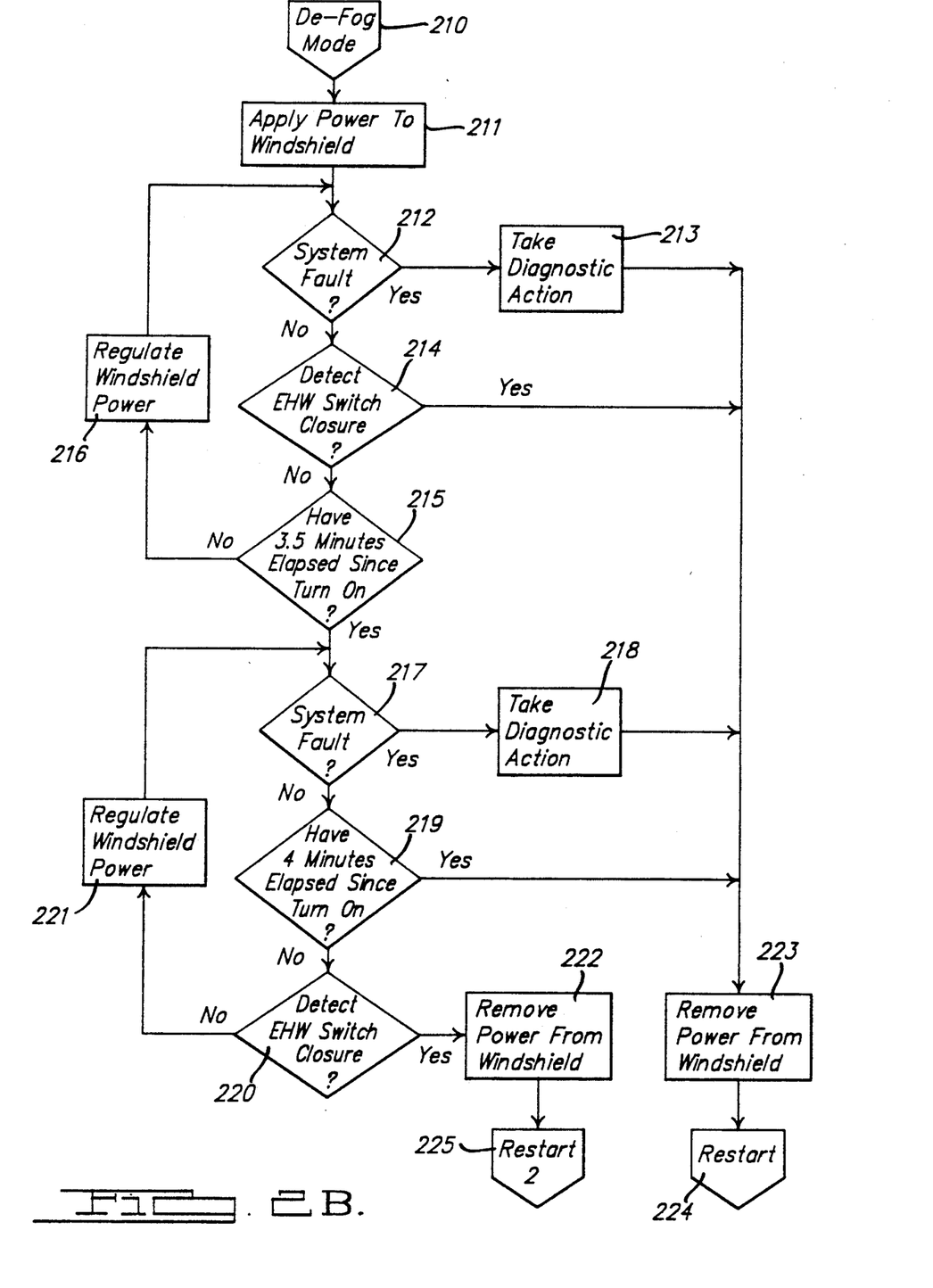

With reference to FIG. 2B, in the DEFOG mode 210 the initial action step at block 211 is to apply normal power (i.e. without activating relay 106 of FIG. 1) to the window heater element 120. Power at the normal level is then applied and regulated to the windshield heater element 120 via step 216 for 3.5 minutes, assuming no system fault or manual switch closure detection is indicated during such time interval. If a system fault or switch closure is detected, then power is removed from the windshield via block 223 and the system goes into RESTART mode 224 of FIG. 2D.

Assuming that power is applied for the 3.5 minute interval without interruption, then the routine again checks for a system fault at decision block 217 and continues to apply and regulate windshield power via block 221 for an additional 0.5 minutes, assuming no switch closure is detected at block 220. If a system fault is detected at this point or if the timing period of 4 minutes total has elapsed then the routine again would remove power from the windshield at block 223 and enter the RESTART routine 224 of FIG. 2D.

Figure 2C:
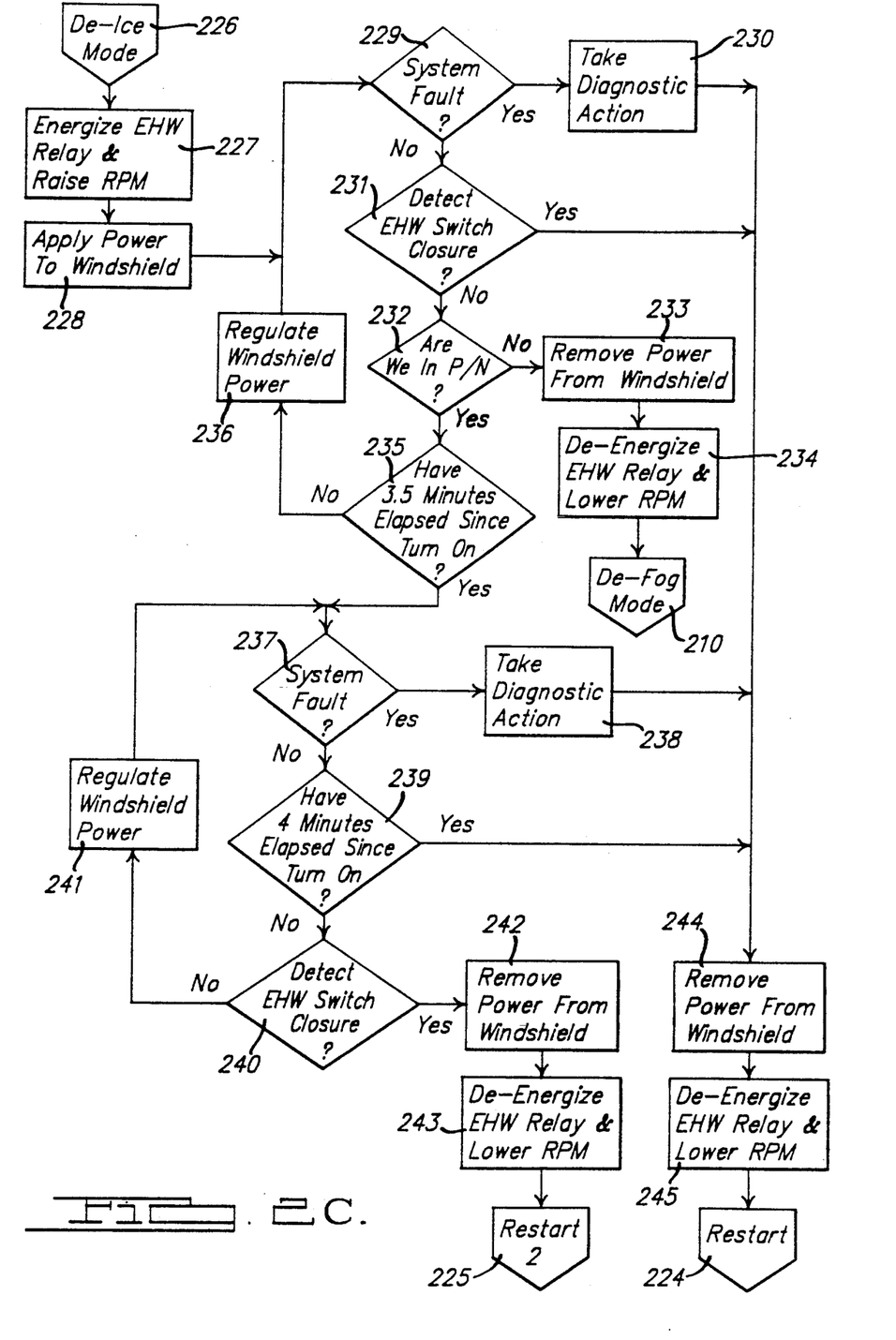
Figure 2D:
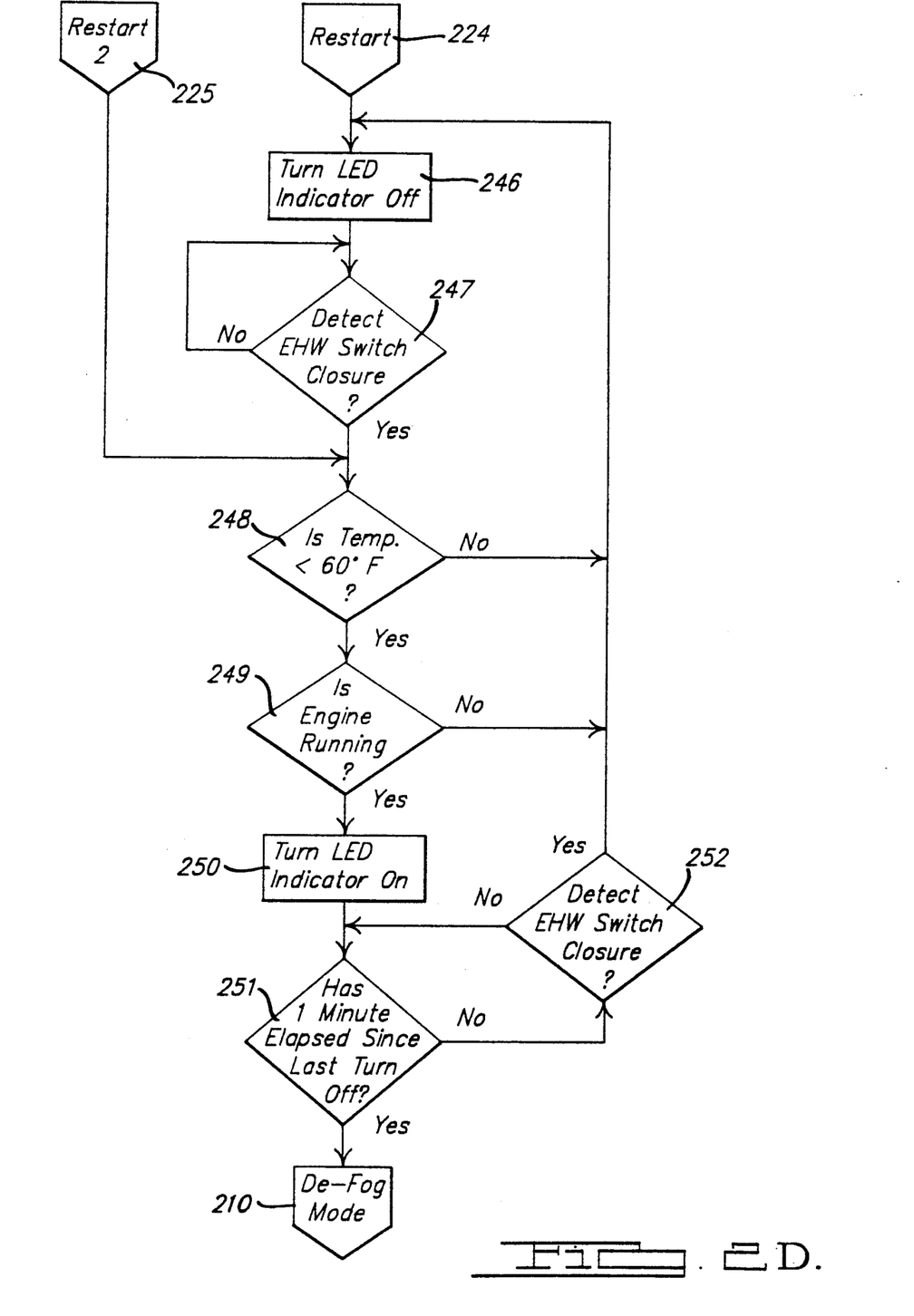

If no system fault or switch closure occurs for the full 4 minute interval, then the system would enter block 222, again remove power from the window heating element and enter RESTART 2 routine 225 of FIG. 2D.

The DE-ICE mode routine 226 is set forth in FIG. 2C. Upon entering DE-ICE mode 226 the relay 106 of FIG. 1, which is designated in the flow chart as the EHW relay, is energized at block 227 and the engine control is instructed to set the RPM level at a higher value. By communicating with voltage regulator 102 (by conventional means not shown), microprocessor unit 108 of FIG. 1 can instruct voltage regulator 102 to turn off field current to alternator winding 1041 during switch-on of filter relay 106. This will avoid arching across contacts 1062, thereby extending relay contact life. Power at the increased level provided by switching the vehicle's battery to the center tap 105 of the alternator 104 of FIG. 1 is then effected at block 228 and power at the increased de-ice level is then maintained and regulated at block 236 for 3.5 minutes, assuming no system fault, no switch closure and no shift from the vehicle's transmission out of park or neutral occurs during the 3.5 minute interval. These tests are made at blocks 229, 231, 232 and 235.

Should a system fault be detected at block 229 then the appropriate diagnostic action at block 230 is taken, power is removed from the window heating element at block 244, the EHW relay is deenergized and the engine RPM is lowered at block 245 and the RESTART routine 224 of FIG. 2D is entered.

If the vehicle is take out of the park or neutral gear as determined at decision block 232, then power is removed from the window heating element at block 233, the EHW relay is deenergized and the engine RPM lowered at block 234 and the DEFOG mode 210 of FIG. 2B is entered.

If de-icing power is applied for the full 3.5 minutes without interruption, then the routine passes to the decision loop utilizing decision steps 237, 239 and 240. In this decision loop if no system fault or switch closure is detected for an additional 0.5 minutes, then windshield or vehicle window power at the de-icing level is maintained. If a system fault is detected, then the appropriate diagnostic action is taken at block 238, power is removed from the window heating element at block 244, the EHW relay (relay 106 of FIG. 1) is deenergized and the engine RPM is lowered at block 245 and RESTART routine 224 of FIG. 2D is entered.

If the manual switch is again activated and detected at block 240 during the timing loop, then power is removed from the vehicle window heating element at block 242, the EHW relay is deenergized and the engine RPM is lowered at block 243 and RESTART 2 routine 225 of FIG. 2D is entered.

Two restart routines 224 and 225 are set forth in the flow chart of FIG. 2D. When RESTART routine 224 is entered, the LED indicating usage of the window heating system is turned off at block 246 and the system then waits for the detection of a subsequent manual switch closure at block 247 indicating a new request for activation of window heating power.

When RESTART 2 routine 225 is entered, the temperature of the window being heated is monitored at block 248 and if the temperature is greater than or equal to 60° F., the system usage indicator LED is turned off and the system again enters into a loop for detecting a subsequent reactivation of the manual switch at block 247. If the temperature of the heated window is less than 60° F. then a test is performed at block 249 to determine whether the vehicle's engine is running. If the engine is not still running, then the routine returns to block 246. If the engine is determined to be running, then the window heater system utilization LED indicator is turned back on at block 250, the system delays or checks for a delay of one minute since the system was turned of at block 251 and the DEFOG mode 210 of FIG. 2B is reentered. If during the 1 minute delay the EHW switch is again detected to have been activated then the routine returns to block 246.

As set forth previously with reference to FIG. 1, current through the window heating element 120 is monitored by current sense amplifier 118 to enable the microprocessor unit 108 to determine whether or not the electrical resistance exhibited by the heater element 120 is within a normal acceptable range. Microprocessor unit 108 may utilize a diagnostic routine in accordance with the flow chart depicted in FIG. 3 in conjunction with data received from amplifier 118.

Figure 3:
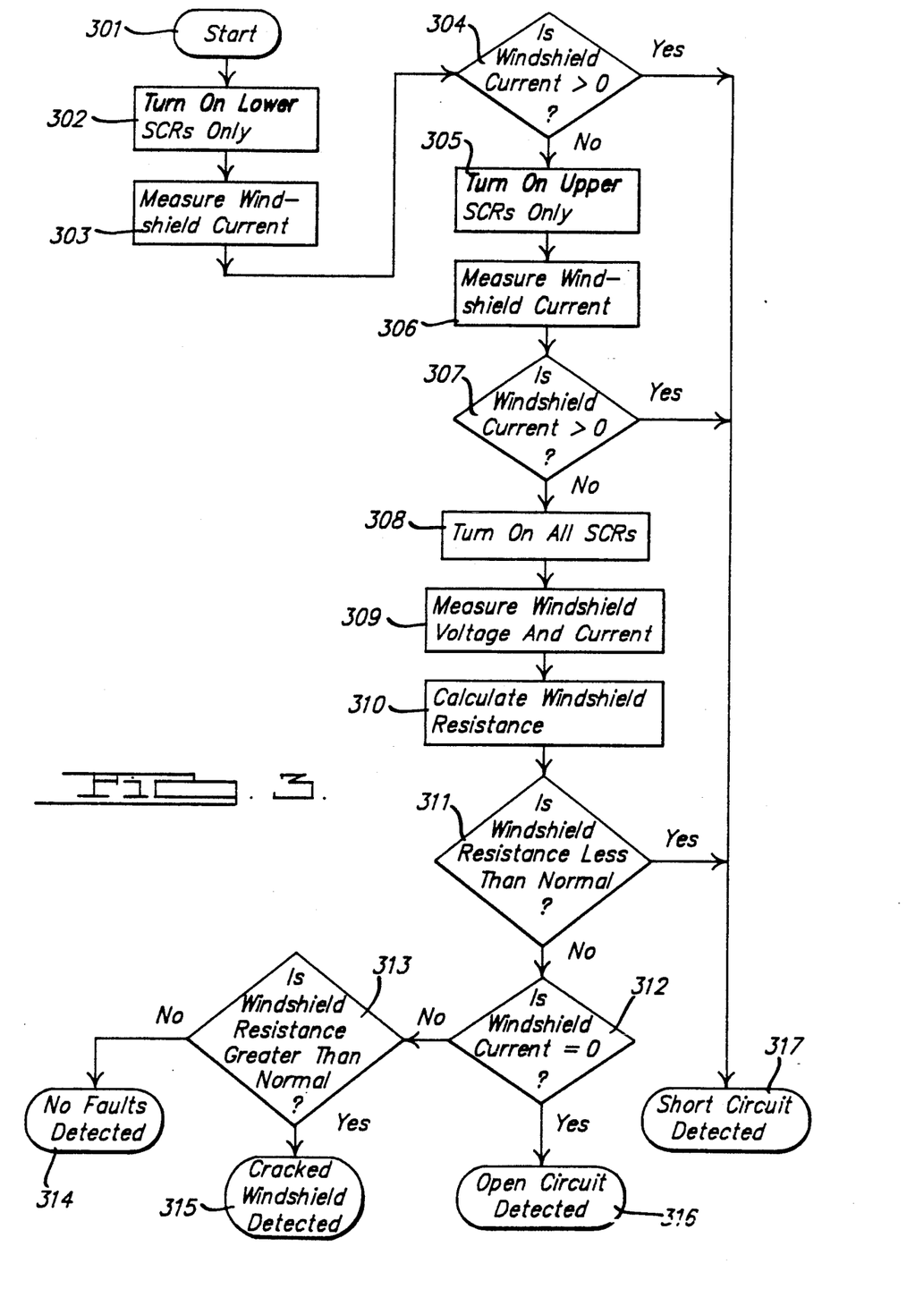
FIG. 3 sets forth a flow chart of a method of diagnosing faults in a heater element utilizing a portion of the apparatus of FIG. 1 in accordance with the principles of the invention.

With reference to FIG. 3, diagnostic testing of the window heating element 120 of FIG. 1 is initiated at block 301 whereupon the lower half of the rectifier bridge providing power to the heater element 120 of FIG. 1 (i.e. SCRs 124a, 124b and 124c) are turned on. At action block 303 of FIG. 3 the microprocessor unit 108 of FIG. 1 then determines the value of the current flowing through heater element 120 utilizing current sensing resistor 140 and current sense amplifier 118 of FIG. 1.

If the processor 108 of FIG. 1 determines that the current flow through the heater element is greater than zero with only ½ of the rectifying bridge turned on, then a short circuit is detected at block 317.

If no heater element current is detected with only ½ of the rectifying bridge turned on, then at block 305 the upper SCRs (122a, 122b and 122c of FIG. 1) are turned on while the lower half of the SCR bridge is turned off. The heater element current is then again determined at block 306 and if the current is detected in block 307 to be greater than zero, then again a short circuit has been detected. The order of which half of the SCR bridge is turned on first depends upon which half is coupled to current sensing resistor 140 of FIG. 1. In the illustrative embodiment of FIG. 1, resistor 140 is coupled between the SCR bridge and a lower terminal of heating element 120. Therefore, the lower half of the SCR Bridge is turned on first in the diagnostic method of the disclosed embodiment. It is to be understood, however, that resistor 140 could be placed between the SCR bridge and an upper terminal of element 120, in which case the upper half of the SCR bridge (i.e. elements 122a, 122b, 122c) would be turned on first in the diagnostic method of the invention.

If the window heating element current has been determined to be zero when only the top half and only the bottom half of SCR bridge has been activated, then all SCRs 122a–122c and 124a–124c are activated at block 308. At this point, the current through and the voltage across the heating element 120 of FIG. 1 are measured at block 309 and the microprocessor 108 of FIG. 1 then determines the resistance of the heating element at block 310. If the calculated window heating element resistance is less than normal, then a short circuit is again detected at block 317. If the window heating element resistance is not less than normal then the windshield current is again tested at block 312. If the heating element current is determined to be zero then an open circuit condition is detected at block 316. If the heating element current is non-zero, then the heating element resistance is again tested in block 313. If the heating element resistance is determined to be greater than normal, then a cracked window heating element is detected at block 315. If the heating element resistance is not greater than normal and no further faults have been detected at block 314, then the diagnostic routine is completed.

In accordance with the routine described above with reference to FIG. 3, it becomes apparent that the ability to selectively turn on and off only the upper and lower halves of the SCR bridge of FIG. 1 and the ability to monitor window heating element current make it possible to diagnose short circuit conditions in the windshield or other window being heated. A properly functioning window heating element will leave the heating element floating with respect to any direct current voltage level. A short circuit will either supply a low impedance path from the heating element to ground or battery or short out the heating element terminals.

With a lower impedance path from the heating element to ground or battery, current will flow if only one half of the SCR bridge is turned on and the short is on that side of the window heating element. This is due to the fact that no current should flow until both halves of the SCR rectifying bridge are activated.

If there is a short circuit at the heating element terminals, substantially higher than normal current will then flow when both halves of the SCR bridge are turned on. Detection of this over-current condition will enable the microprocessor 108 of FIG. 1 to turn off the SCR bridge before damage can occur.

Additionally, the ability of the microprocessor 108 of FIG. 1 to determine heating element current makes it possible to detect an open circuit condition at the heater element. With voltage applied to the heater element, current should flow. Hence, if there is no current under such conditions, an open circuit can be detected.

A crack in the heater element will have the effect of increasing the resistance presented by that element. Hence, by measuring the heater element current and voltage, actual heater element resistance can be calculated by microprocessor 108 of FIG. 1 and this value compared to an acceptable range. If the actual resistance presented by the heater element is greater than normal, microprocessor 108 may deduce that the heater element is cracked and remove power from that element to prevent a potential safety hazard.

An added feature of utilizing a controlled switchable rectifying bridge such as that comprised of SCRs 122a-122c and 124a-124c of FIG. 1 is that so-called "load dump" conditions may be prevented. A "load dump" condition, wherein a potentially devastating high voltage and current pulse may occur when loads are suddenly disconnected from a vehicle's electrical system, may be prevented by measuring the system voltage when the bridge circuit is deactivated. In this way the beginning of such a high load dump pulse may be sensed and the SCRs can then be turned on to suppress the remainder of the load dump pulse by reconnecting the load to the power control circuit.

The principles of the disclosed invention are applicable to any window surface of a vehicle. Furthermore, the scope of the invention is to be determined by the appended claims, and the detailed description of a preferred embodiment has been given for the sake of example only.

What is claimed is:

1. In an electrical power system for a vehicle including a DC power source and voltage regulator means coupled thereto, an arrangement for controlling supply of electrical power to a heating element of the vehicle, the arrangement comprising:
    a multi-phase alternator coupled to the voltage regulator means and having a center tap, a rectified alternator output, and individual phase outputs;
    switching means coupled to the alternator center tap, the rectified alternator output and the DC power source operative in a first state to couple the rectified alternator output to the DC power source and operative in a second state to couple the alternator center tap to the DC power source;
    transformer means having inputs coupled to the individual phase outputs of the alternator;
    controlled rectifier means coupled between outputs of the transformer means and the heating element; and
    control means coupled to the switching means and the controlled rectifier means, the control means operative to determine the first and second states of the switching means and to enable and disable the controlled rectifier means.

2. The arrangement of claim 1 further comprising sensing means coupled between the control means and the heating element, operative to enable the control means to determine electrical resistance of the heating element.

3. The arrangement of claim 1 wherein the multi-phase alternator comprises a three-phase alternator with its phase windings configured in a "Y" connection and its center tap taken from the common junction of the three-phase windings.

4. The arrangement of claim 1 wherein the transformer means comprises an autotransformer.

5. The arrangement of claim 1 wherein the switching means comprises relay means having a normally closed contact coupled between the rectified alternator output and the DC energy source and a normally open contact coupled between the alternator center tap and the DC energy source.

6. The arrangement of claim 1 wherein the control means comprises a stored program control means.

7. The arrangement of claim 1 wherein the controlled rectifier means comprises a full-wave rectifier bridge circuit comprising a plurality of silicon controlled rectifiers, each having a gate electrode coupled to the control means.

8. The arrangement of claim 2 wherein the control means further comprises diagnostic means responsive to the determination of the electrical resistance of the heating element to disable the controlled rectifier means whenever the electrical resistance is not within a preselected range of values.

9. The arrangement of claim 1 wherein the control means is capable of continuous regulation of power delivered to the heating element by varying a duty cycle of the controlled rectifier means.

10. In an electrical power system for a vehicle including a battery and a voltage regulator coupled thereto, apparatus for controlling supply of electrical power to a defogging/de-icing heating element associated with a window of the vehicle, the apparatus comprising:
    a three-phase alternator having its three-phase windings arranged in a "Y" configuration such that a first end of each of the phase windings is commonly coupled at a center tap to the other phase windings and a second end of each of the phase windings is coupled to a full wave rectifier bridge;
    relay means having a normally closed contact coupled between an output of the full wave rectifier bridge and the battery and a normally open contact coupled between the center tap and the battery;
    a three-winding autotransformer having a center tap of each winding coupled to a second end of different ones of the phase windings of the alternator, a first end of each autotransformer winding coupled in common, and a second end of each autotransformer winding serving as an autotransformer output;
    a controllable full-wave rectifier bridge comprising an upper silicon controlled rectifier (SCR) and a lower silicon controlled rectifier associated with each autotransformer output, each autotransformer output coupled to a junction of an anode electrode of the associated upper SCR and a cathode electrode of the associated lower SCR, the upper SCRs having cathode electrodes commonly coupled to a first terminal of the heating element, the lower SCRs having anode electrodes commonly coupled to a second terminal of the heating element; and
    microprocessor control means coupled to a coil of the relay means and to gate electrodes of each of the upper and lower SCRs, the microprocessor control means operative to operate and release the relay means and to turn the SCRs on and off via their gate electrodes in accordance with a predetermined stored program resident in the microprocessor control means.

11. The apparatus of claim 10 further comprising a first SCR drive circuit coupled between the microprocessor control means and the gate electrodes of the first, second and third upper SCRs, and a second SCR drive circuit coupled between the microprocessor control means and the gate electrodes of the first, second and third lower SCRs.

12. The apparatus of claim 11 further comprising current measuring means coupled between the heating element and the micro processor control means, operative to indicate to the microprocessor control means the electric current flowing through the heating element.

13. The apparatus of claim 12 wherein the microprocessor means further comprises diagnostic means operative upon receipt of an indication from the current sensing means to determine a value of electrical resistance exhibited by the heating element and to disable the SCRs whenever the value of electrical resistance is outside acceptable limits.

14. The apparatus of claim 13 wherein the diagnostic means includes means for enabling only a first half of the SCR bridge and only a second half of the SCR bridge while monitoring current flow through the heater element under both enabling conditions.

15. The apparatus of claim 11 wherein the microprocessor control means is capable of continuous regulation of power delivered to the heating element by varying conduction times of the silicon controlled rectifiers via the first and second SCR drive circuits.

* * * * *